United States Patent [19]

Tonnelli

[11] 4,096,752
[45] Jun. 27, 1978

[54] OIL WELL LOGGING PROBE ASSEMBLY

[75] Inventor: Gerald J. Tonnelli, Long Beach, Calif.

[73] Assignee: Production Data Inc., Bakersfield, Calif.

[21] Appl. No.: 702,915

[22] Filed: Jul. 6, 1976

[51] Int. Cl.² ............... E21B 47/024; H02G 15/22
[52] U.S. Cl. .................................. 73/431; 73/151; 174/77 R; 174/89
[58] Field of Search .............. 73/431, 151, 153; 166/64–66; 339/16 R, 16 C, 94 C, 135; 174/77 R, 89; 92/165 R

[56] References Cited

U.S. PATENT DOCUMENTS

| 2,297,828 | 10/1942 | Hatford | 339/94 R X |
|---|---|---|---|
| 2,877,031 | 3/1959 | Lee | 174/89 X |
| 2,939,906 | 6/1960 | Harwood | 174/77 R |
| 3,054,848 | 9/1962 | Reesby et al. | 339/104 X |
| 3,503,444 | 3/1970 | Owen | 166/65 R |
| 3,681,739 | 8/1972 | Kornick | 339/94 C |
| 3,692,106 | 9/1972 | Basham et al. | 166/64 X |
| 3,781,456 | 12/1973 | Knowles et al. | 166/65 R X |
| 3,910,165 | 10/1975 | Sheesley et al. | 92/165 R |

FOREIGN PATENT DOCUMENTS 112,951  2/1918  United Kingdom ............... 339/104

*Primary Examiner*—Daniel M. Yasich
*Attorney, Agent, or Firm*—William C. Babcock

[57] ABSTRACT

A cylindrical high temperature logging tool assembly suspended from the shield of a coaxial cable for insertion into the interior of a well bore. To isolate the instruments contained within the interior of the cylindrical assembly from the fluids or steam within the well bore, and to facilitate assembly, the cylindrical oil tool comprises a plurality of axially aligned segments including a grease holding cavity at the end thereof wherein a quantity of non-conducting grease is packed and is compressed therein by the threadable engagement of the sections. Since most greases are generally incompressible, the threaded assembly provides a technique by which the grease pressure level within the housing can be achieved which are greater than the pressure head within the well bore. In this manner an integral structure is provided which can be deployed at various depths within the well bore and which furthermore provides selective arrangement of sections to arrange the requisite instrumentation for well bore logging.

5 Claims, 8 Drawing Figures

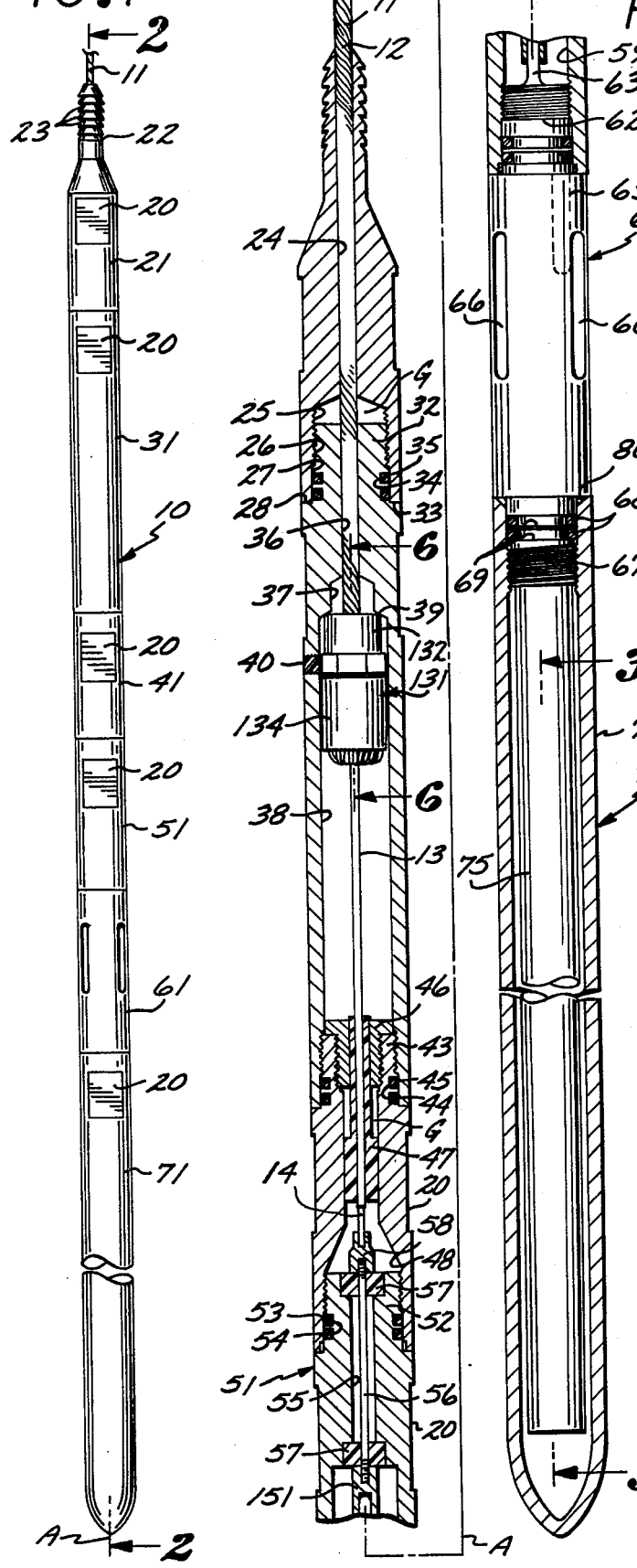
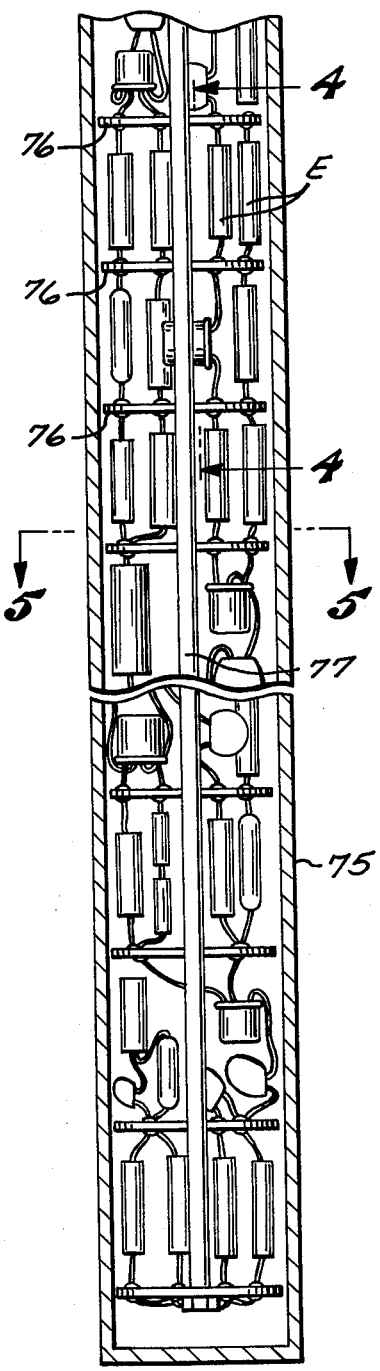
FIG.1　　FIG.2　　FIG.3

OIL WELL LOGGING PROBE ASSEMBLY

BACKGROUND OF THE INVENTION

1. Field of the Invention

The present invention relates to high temperature well logging instruments and more particularly to apparatus for enclosing and insulating such instruments from exposure within the well bore.

2. Description of the Prior Art

Measurements directed to identify the more or less productive stations along a well bore have been made extensively in the past. As the electronics technology increased in its development, the perameters which can be discriminated by various measurement techniques also increase. As a consequence of this increase, more and more instruments are available for insertion within the well bore. In many prior devices, such instruments were often arranged within a cylindrical housing which was then submerged or deployed within the well bore. One such device particularly suited for well bore logging has been described in a copending application, Ser. No. 592,981, filed July 3, 1975, now Pat. No. 4,015,194, by Karol E. Epling and assigned to the same assignee. In that application, a feed-through arrangement of various axially disposed instruments has been disclosed which is particularly suited for adding or removing selected instruments according to the needs of a particular well bore. The above-referenced application was particularly directed at measuring the presence of water and oil within the well bore fluids at various stations of the well bore. Such subterranean water very often includes salts and various other minerals, in solution, which constantly pose a threat to the electronic circuitry associated with each instrument. The potential of shorting, especially in steam, the instrument is most pronounced at the attachment interface thereof where, according to the above-referenced application, a common lead provides both the power and the measurement path for the instrument.

SUMMARY OF THE INVENTION

Accordingly, it is the general purpose and object of the present invention to provide a sealing arrangement for an axially stacked instrument array, where the seal thereof is effected by a trapped volume of insulating grease which, during assembly, can be compressed to various levels of pressure.

Further objects of the invention are to provide a feed-through seal formed by an insulating fluid which can be selectively preset to a positive pressure differential.

Yet other objects of the invention are to provide a feed-through seal useful in stacking a plurality of instruments along a common axis wherein the sealing interface can be conveniently achieved during field assembly.

Briefly, these and other objects are accomplished within the present invention by forming a female cavity within one end of the interfacing instrument, the peripheral interior surfaces of said cavity including a threaded section for engaging a threaded male projection at the end of the adjacent instrument segment. Formed adjacent the threaded interior section, along peripheral strip adjacent the free end of the female cavity, is a smooth sealing surface against which an O-ring received in an O-ring groove on the male projection is compressed. By way of this arrangement, a sealing engagement between the O-ring and the smooth peripheral strip can be made at various levels of insertion of the male projection into the female cavity. Receivable also in a female cavity is a quantity of non-conducting grease which is then compressed by the insertion of the male projection to a predetermined level of internal pressure. The viscosity and the molecular size of the grease will therefore provide a barrier to any entry of water, thus insulating any electrical components therein from exposure.

This general arrangement of a sealing interface is repeated with various modifications along the structure of the probe assembly. Since, as described in the above-referenced application, it is intended to use a probe as configured herein in conjunction with a single strand coax cable and, since it is further intended to support the probe by the shield wires of the cable itself, the major path for the surrounding fluids is along these shield wires to support engagement. Once this path is established, the exterior liquids of the exterior water or steam can then propagate along the insulation of the center lead until it reaches the point of connection thereof. To accomodate a seal with this arrangement of parts, the following mechanical layout is necessary. First, the logging cable itself is passed through a close-fitting central bore of a cylindrical cable guide segment which, at its bottom end, is provided with the aforementioned female cavity arranged in an annular fashion around the exterior of the cable. The cable is then passed again, through an axial bore, to the interior of a shield-retaining segment wherein the shield of the cable is unbraided and is secured in a shield clamping fixture. The insulated central lead of the cable is then passed through the interior of the shield retaining segment to be received in a feed through segment again connected in a male-female arrangement as described above. Secondly, the center conductor of the shielded cable is then exposed within the interior cavity of the feed-through segment for connection. The connection is effected by way of a threaded female connector at the end of the center lead which then engages a threaded terminal extending beyond the male projection of an instrument adaptor segment. The instrument adaptor segment includes, at the other end of the threaded terminal, a banana jack extending into the interior of a female cavity therein. The female cavity, again in a manner similar to that described above, is then adapted to receive the male projection at one end of an instrument segment which includes, extending therefrom, the banana plug aligned for insertion within the jack. This cavity, as all of the other cavities described above, is again filled with sealing grease and, as the instrument segment is threaded into the interior of the adaptor segment, that grease is compressed to a positive level of interior pressure. The remainder of the instrument segments are similarly connected to terminate in a closed end segment of the probe.

Thus, any desired instrumentation array can be achieved after the cable guide segment, the shield retaining segment, the feed-through segment and the instrument adaptor segment are assembled. This manner of assembly provides for an integral structure in the segments which form the dominant path of leakage. The remainder of the segment, i.e., the instrument segment, can then achieve further sealing by the interfacing structures thereof which, in conjunction with the positive pressure of the sealing grease, form an effective seal which can be repeatedly made.

BRIEF DESCRIPTION OF THE DRAWING

FIG. 1 is a side view of an oil well logging probe constructed according to the present invention;

FIG. 2 is a sectional view taken along line 2—2 of FIG. 1;

FIG. 3 is a partial sectional view taken along line 3—3 of FIG. 2;

DESCRIPTION OF THE SPECIFIC EMBODIMENT

Figure 4:
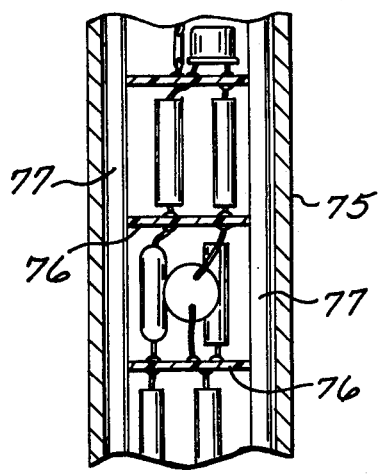
FIG. 4 is a partial sectional view taken along line 4—4 of FIG. 3.

While the following description of the specific embodiment is taken up with specific reference to oil well logging uses, such uses are intended for illustration only. It is to be understood that uses other than instrumentation of a well bore can be achieved by the structure disclosed herein and no intent to limit the scope of the invention is expressed thereby.

As shown in FIG. 1, a well logging probe, generally designated by numeral 10, is suspended from the free end of a shielded, coaxial cable 11, which is adopted to provide both the power to the various instrument segments therefore, and to return the measurement signals therefrom. The probe itself is arranged in the manner of an elongated cylinder having a common central axis A and comprising a plurality of cylindrical segments connected end-to-end in axial alignment along such axis. More specifically, formed on the upper end of probe 10 is a cable guide segment 21 forming a reduced diameter upper section 22 around the exterior of cable 11, section 22 being furthermore provided with downwardly directed conical grooves 23 to facilitate the capture of the probe 10 by any convenient capture device should cable 11 break. Extending from the lower end of the cable guide segment 21 and aligned axially therewith is a shield retaining segment 31 which, in turn, engages a feed-through segment 41 at the other end thereof. Segment 41, in turn, is aligned to engage the upper end of an instrument adaptor segment 51 which support two axially disposed instruments such as a temperature sensing instrument 61 and a gamma sensing instrument 71. Formed on the exterior surface of each segment are plurality of wrench engaging flats 20 whereby threaded engagement of one segment in the interior of the other segment can be made to any desired level of torque.

Figure 6:
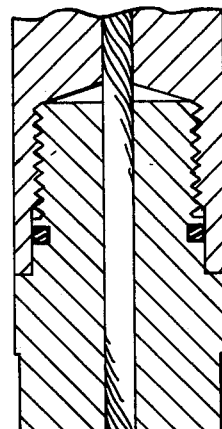
FIG. 6 is a partial sectional view illustrating the detail of the sealing interface between a cable guide segment and a shield retaining segment.

As shown in FIGS. 2 and 6, cable 11 includes an exterior braided wire shield 12 which is disposed to surround an insulating sleeve 13 around a center conductor 14. In this form, cable 11 is configured as a shielded, coaxial cable, conventional in an arrangement of parts, the shield 12, however, also functioning as the load supporting structure for the probe. In this form, cable 11 is received within a central bore 24 extending through section 22 along axis A into the interior of the segment 21. The dimensions of bore 24 are conformed to the exterior dimensions of shield 12 to thus provide only small peripheral passages which are easily filled by a fluid having high viscosity coefficients and large molecular structures.

The above-mentioned field affected by way of a fluid having the properties of grease necessarily entails a procedure by which this grease is forced into the interspaces between shield 12, sleeve 13, and bore 24. Such procedure is provided for in the inherent characteristics of attachment herein. Specifically, formed on the lower end of segment 21 is a cylindrical interior cavity 25 which, on the upper surface thereof, communicates with bore 24. Cavity 25 includes a threaded peripheral strip 26 on the interior thereof disposed adjacently above a larger diameter smooth peripheral sealing surface 27 which is disposed adjacent the lower end 28 of the segment. Thus, formed within cavity 25, is the strip 26 with which threaded engagement can be made by a male projection 32 formed on the upper end of segment 31. Projection 32 furthermore includes a shoulder 33 at the juncture with the segment and a ring groove 34 receiving an O-ring 35 around the periphery thereof, the O-ring 35 being thus aligned to form a seal against the sealing surface 27. The longitudinal dimension of projection 32 beyond shoulder 33 is less than the receiving dimension of cavity 25. Thus, the free edge 28 will abut the shoulder 33 before the male projection 32 bottoms out within the cavity. In this manner a residual volume of sealing grease G is maintained within cavity 25, the same grease G being forced upwardly into bore 24 during the process of assembly.

Segment 31 is similarly provided with a bore 36 again conformed to the exterior dimension of shield 12. Bore 36 is axially aligned with axis A, extending through projection 32 into a cavity 37 on the interior of segment 31. Cable 11 is aligned to pass through bore 36 into the cavity 37 to engage thereat a shield attachment fixture generally shown by the numeral 131. Fixture 131 is located within the interior of an expanded cavity 38 which, again, is coaxial with cavity 37, expanding across a tapered shoulder 39 to a dimension conformed with the exterior of fixture 131. Fixture 131, in turn, comprises a clamping bolt 132 provided with a concentric bore 133 through which the cable 11 is, once again, passed. Bolt 132 is threadably received in a clamping nut 134 having formed around the periphery thereof, a plurality of drilled holes 135 through which the individual wire strands of the unbraided shield 12 are returned and compressed at the interface of nut 134 anf bolt 132. In this manner, a clamping device or attachment fixture is formed which will support the probe by the interfering surfaces of the bolt 132 and shoulder 39.

Figure 5:
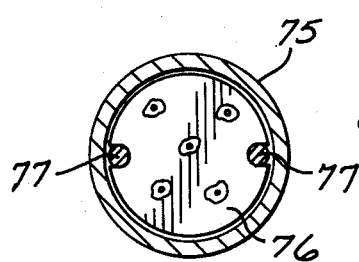
FIG. 5 is a plan view in section taken along line 5—5 of FIG. 4.
Figure 8:
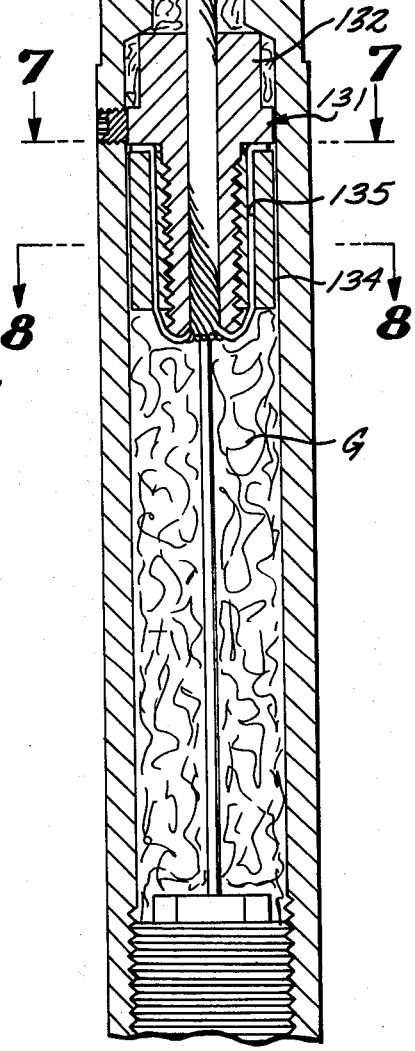
FIG. 8 is yet another plan view, in section, taken along line 8—8 of FIG. 7.
Figure 8:
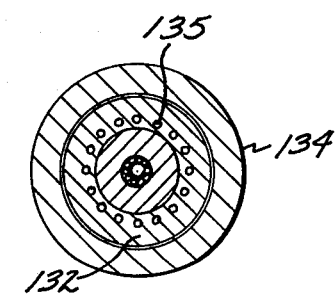

To provide a secure ground, segment 31 further includes a set screw 40 passing laterally through the side of cavity 38 to compress the lateral surface of bolt 132. Thus, both structural support and ground return are assured by way of this interconnection of the shield 12 the leakage across the threads of the set screw being avoided by any conventional sealing compound. Extending below the attachment fixture 131 again along axis A, is now the insulated center conductor 14 which is received within the interior of the feed-through segment 41. Feed-through segment 41 generally comprises an annular housing 25 terminating in a reduced section male fitting 43 at the upper end thereof which is threaded over the exterior surface to engage a similarly threaded interior surface of cavity 38. Disposed around the male fitting 43 in a manner quite similar to the interface of segment 31 with segment 21 are 2 O-rings 45 received within a ring groove 44. The male fitting 43 in addition to the exterior threads include an interior threaded portion which engages exterior threads formed on an annular metal guide or grommet 46. Received within the interior of the annular grommet 46 and the housing 42 is a tubular guide 47 having a lower section conformed to the interior dimensions of the housing and an upper section conformed for receipt within the central bore of a grommet 46. The interior dimensions of guide 47 are furthermore conformed to the exterior dimensions of shield 13, thus providing a sealing interface, any voids therebetween being filled by the grease G during the assembly sequence described herein. The reduced exterior section of guide 47 extends over a segment thereof which is substantially longer than the longitudinal dimension of guide 47. Thus, an annular cavity 48 is formed between the exterior of guide 47 and the interior of housing 42 within which the grease G once again is received. In a manner similar to the connections disclosed above, the lower end of segment 41 again includes an expanded cavity 48 which is threadably engaged to a projection 52 on the upper end of segment 51. Once more, a seal is effected between the projection 52 and the interior of cavity 48 by way of 0-rings 53 received within a peripheral groove 54. Segment 51 provides the adapter function whereby various instruments can be selectively attached thereto. To achieve this purpose, segment 51 includes a central bore 55 having disposed concentrically therethrough a rigid conductor 56 which is fixed relative the segment at both ends by corresponding annular insulation fixtures 57. At the upper end, conductor 56 projects beyond the longitudinal dimension of section 52, threadably attaching thereat a connecting fitting 58 which, in turn, is connected to the center conductor 14. At the lower end, conductor 56 is exposed on the interior of a cavity 59 to threadably engage thereat a banana jack 151. Receivable within cavity 59 in a manner once more similar to those described, is the upper end of segment 61 conformed herein as a temperature sensing instrument. Specifically, segment 61 includes, once more, a reduced diameter projection 62 having mounted, on the upper surface thereof, a banana plug 63 which is receivable within the jack 151. While the following description of the temperature sensing device may be altered according to use, there is disposed on the interior thereof a Thermo-well 65 which senses the temperature of the well fluid entering into the interior of the segment by way of a plurality of lateral slots 66. At the lower end, segment 61 is conformed for an end connection and therefore is provided with a downwardly extending reduced diameter projection 67 threadably received within the interior of the end housing 72 forming the exterior shell of the gamma sensing instruments 71. Disposed from the lower end of segment 67 and extending into the interior of shell 72 is a canister or dewar flask, 75 containing a plurality of electronic components. As shown in FIGS. 3, 4, and 5, canister 75 comprises a tubular section closed at the bottom and having disposed on the interior thereof a stack of circuit wafers 76 arranged in a column on a center bolt 77 extending therethrough. Between the adjacent wafers 76 there are disposed the various electrical components E as required to effect the measurement. Within this stage, the connection of canister 75 is integral with the bottom end of segment 61, thus no particular sealing arrangements are necessary therefor. Where a certain permeability is desired, canister 75 is aligned to a fixed gap of separation relative housing 72 and a sealing arrangement comprising two parallel O-rings 68 arranged in parallel grooves 69, effects the seal herein. To further ensure proper sealing, particularly at high static heads and high temperatures as exist in a deep well bore, the upper end of housing 72, and the lower ends of sections 10 and 20 are cut on a chamfer 79 against which a larger size Teflon radial seal 80 is compressed.

Figure 7:
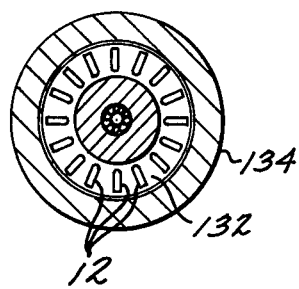
FIG. 7 is a plan view in section taken along line 7—7 of FIG. 6.

By way of this arrangement of parts, the operative structure of the present invention is set forth. More specifically, as shown in FIGS. 6 and 7, the cable 11 is secured by its shield 12 to the retainer fixture 131 and is aligned within bores 36 and 24 to emerge on the upper ends of the probe. A sealing fluid such as grease G, during the assembly of the two segments, is compressed into these bores to thus fill the gaps between the strands of the shield and the bore surface. Since the molecular size of the various greases is typically fairly large and since the normal viscosity coefficients are also large, a large pressure gradient can be developed along the length of the corresponding bores. Thus, cavity 25, during installation, can achieve large internal pressures which very often can be larger than the static pressure within the well bore. Should such pressure even exceed the internal cavity pressure, again, the large molecular size of the grease and the viscosity coefficients thereof preclude an effective mixing with the well bore fluid, thus providing isolation. For the purposes herein, the grease G can be any non-conducting grease material and particularly any lithium based grease which is neutral in conductivity at various temperatures. For the purposes herein, it is also necessary that the grease G possess the viscosity characteristics necessary to effect such seal. Accordingly greases having substantially high viscosity coefficients at the typical well bore temperature levels are appropriate for this purpose.

Some of the many advantages of the present invention should now be readily apparent. This invention provides, by convenient arrangement of parts, a sealing arrangement, which, during each selection of instruments, positively effects the seal. This the invention provides with structure convenient to produce, utilizing conventional sealing contacts and requiring few parts.

Obviously many modifications and variations to the above disclosure can be made without departing from the spirit of the invention. It is therefore intended that the scope of the invention be determined solely dependent on the claims hereto.

I claim

1. In a cylindrical probe assembly adapted to include selected instruments arranged in a cylindrical stack each instrument communicating by way of a common coaxial cable having a braided wire strand shield thereof connected to support said probe assembly, the improvement comprising:

an annular guide segment including a first central bore conformed to the exterior of said cable, a first cavity axially aligned with said first central bore on the lower end of said segment a first threaded peripheral surface formed on the interior surface of said first cavity, and a first sealing peripheral surface formed along said threaded first peripheral surface proximate the lower end of said segment;

an annular attachment segment including a first reduced diameter section at the upper end thereof adapted for receipt within said first cavity for threadable engagement therewith and including a first sealing ring disposed peripherally thereabout to abut said first sealing peripheral surface said attachment segment further includes a second central bore formed in the upper end thereof adapted to receive said cable, a second cavity formed in the lower end thereof communicating with said second bore, a clamping device disposed within said second cavity for engaging the shield of said cable thereat, said clamping device having a male fitting including a peripheral flange on the upper portion thereof conformed to sealably engage said second cavity, and exteriorly threaded surface over a lower portion thereof below said flange and an internally threaded annular female fitting provided with a plurality of longitudinal radially disposed openings conformed to receive selected wires of said braided wire strand shield, said wires extending to the upper end of said female fitting to be secured by compression against said flange and a second threaded and sealing peripheral surface formed on the interior periphery of said second cavity proximate the lower end thereof; and said fluid includes a non-conducting grease compound deposited in said first cavity prior to the receipt of said first section therein.

2. Apparatus according to claim 1 further comprising;
an adaptor segment including a second reduced diameter section on the upper end thereof conformed for receipt within said second cavity, a conductor centrally disposed therethrough adapted to connect to the center lead of said cable and insulating means connecting said conductor to said adaptor segment, said adaptor segment being formed to selectively engage instrument segments at the lower end thereof.

3. Apparatus according to claim 2 further comprising:
a feed-through segment interposed between said adaptor segment and said attachment segment for sealably guiding the center lead of said cable to said conductor.

4. A sealing interface for use with a well bore instrument comprising:
a first segment in the instrument including an electrical conductor means passing centrally therethrough;
a first threaded cavity formed towards the lower end of said first segment in concentric relationship with said electrical conductor means;
an integrally connected second segment means adapted to centrally receive said electrical conductor means, said second segment means including a central bore having received said conductor means therein, a sleeve slidably surrounding said conductor means having the lower end thereof conformed to the upper dimensions of said bore, an annular seal received in one end of said bore for slidably receiving the upper end of said sleeve and non-conducting grease compound received in said second segment means between said annular seal and said lower end of said sleeve;
a first projection formed to extend into said second segment means in surrounding relationship with said conductor means, said first projection being conformed for threadable receipt within said first cavity;
sealing means peripherally disposed around said first projection for effecting a seal with said first cavity; and non-conducting grease compound deposited in said first cavity.

5. Apparatus according to claim 4 wherein:
said sealing means comprises an O-ring peripherally disposed on said first projection.

* * * * *